March 25, 1952 A. V. T. HOUSER 2,590,320
SUPPLEMENTAL THROTTLE CONTROLLING DEVICE
Filed Sept. 18, 1946
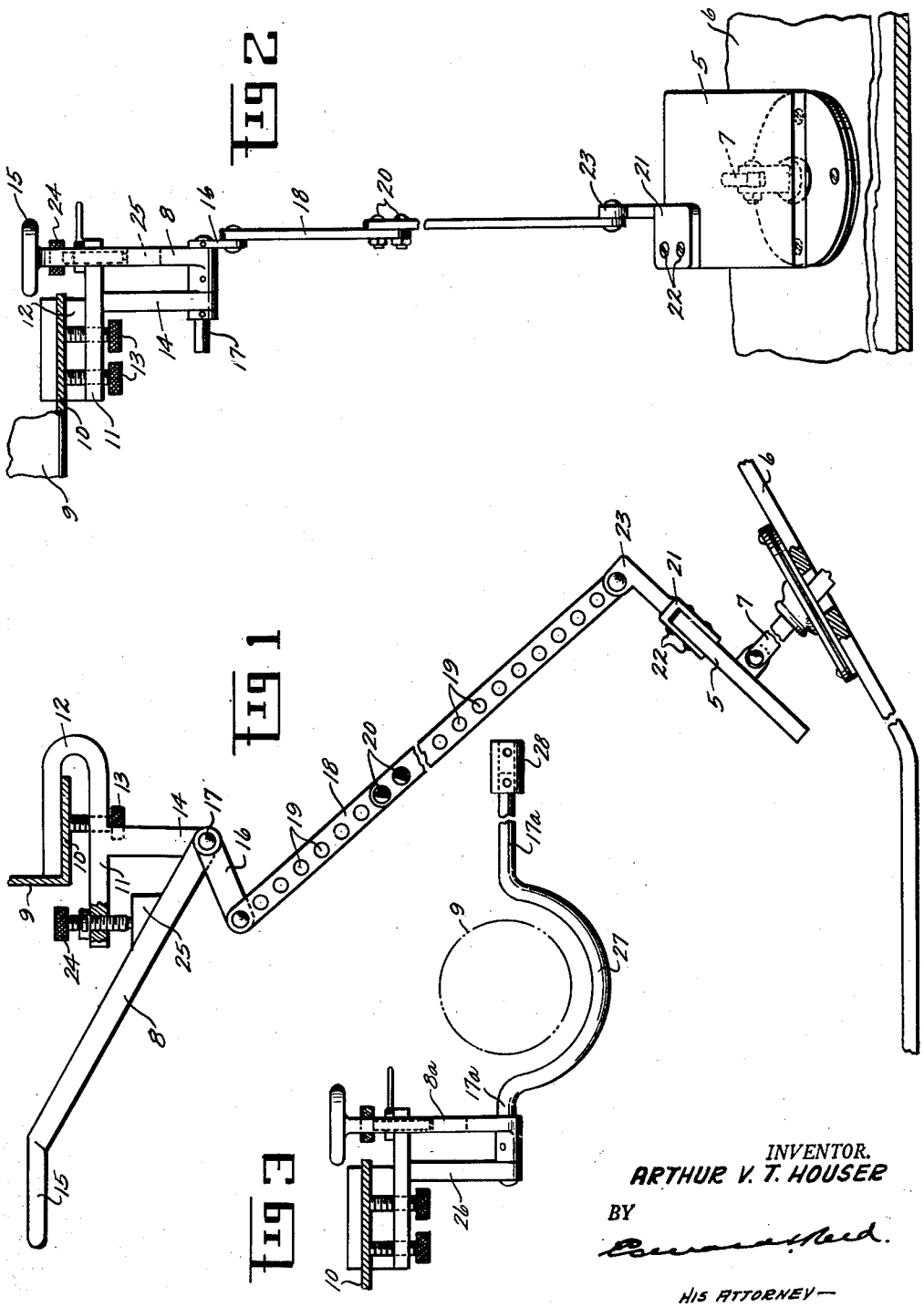
INVENTOR.
ARTHUR V. T. HOUSER
BY
HIS ATTORNEY—

Patented Mar. 25, 1952

2,590,320

UNITED STATES PATENT OFFICE 2,590,320

SUPPLEMENTAL THROTTLE CONTROLLING DEVICE

Arthur V. T. Houser, Dayton, Ohio

Application September 18, 1946, Serial No. 697,655

5 Claims. (Cl. 74—482)

This invention relates to a supplemental throttle controlling device, or accelerator, for a motor vehicle.

The present day motor vehicle is usually provided with a throttle controlling pedal on which the driver's foot must rest to maintain the vehicle in motion. On trips involving long periods of continuous driving the driver's foot or leg will often become tired or cramped and cannot be rested without removing the foot from the pedal, which would result in the slowing down or complete stopping of the vehicle.

One object of the invention is to provide a supplemental throttle controlling device which can be operated by the hand of the driver to control the movement of the vehicle when his foot is removed from the pedal, and which may be used temporarily to permit the driver to rest his leg or may be used continuously, as by a person having only one leg.

A further object of the invention is to provide such a device which is of simple inexpensive construction and which can be easily attached to an existing vehicle or which may be built into a new vehicle.

A further object of the invention is to provide such a device in which the actuating member will move with the pedal when the latter is operated by the foot, so that the control may be shifted from the pedal to the hand operated device, or vice versa, without altering the speed of the vehicle.

A further object of the invention is to provide such a device in which the actuating member may be located on either side of the steering column to accommodate the same to either right hand or left hand operation.

A further object of the invention is to provide a throttle controlling device of such character that in the event the driver falls asleep or becomes otherwise incapacitated the pressure of the hand or foot on the controlling device will be relieved and the throttle will be automatically closed, the device thus serving as a safety device.

Other objects of the invention may appear as the device is described in detail.

In the accompanying drawings Fig. 1 is a side elevation of a throttle controlling device embodying the invention; Fig. 2 is a rear elevation of such a device; and Fig. 3 is a rear elevation of an auxiliary device to enable the actuating member to be arranged on that side of the steering column opposite the pedal.

In these drawings I have illustrated one embodiment of the invention and have shown the same as applied to a throttle controlling pedal of a well known type, but it is to be understood that the device as a whole, as well as the several parts thereof, may take various forms and may be connected with foot operated throttle controlling devices of various kinds, without departing from the spirit of the invention.

The embodiment here illustrated is shown in connection with the pedal 5 which may be of any suitable character and preferably comprises a small foot plate or button pivotally mounted on the upper end of the plunger or longitudinally moving rod 7 which extends through and is movable in the foot board 6. The lower end of the plunger is connected in the usual manner with the throttle valve of the carburetor, so that the depression of the pedal will open the throttle, the usual spring means being provided to return the pedal to its elevated position and close the throttle. The connections between the plunger 7 and the throttle valve are of ordinary construction and are not shown. In such an arrangement the heel of the driver's shoe rests on the foot board and the forward part of the sole rests on and actuates the pedal.

The supplemental controlling device comprises an actuating member, such as a lever 8, pivotally mounted on a fixed part of the vehicle above and in front of the inclined steering column 9 and above the pedal 5. The actuating member or lever 8 may be mounted on an integral part of the vehicle, but in order that the device may be installed on existing automobiles it is preferable to provide a separate supporting structure which can be attached to vehicles of standard construction. The instrument board 9 of many motor vehicles is provided at its lower edge with a forwardly projecting flange 10 to which the lever supporting structure may conveniently be attached. In the present instance that structure comprises a bracket 11 having a U-shaped portion 12 adapted to embrace the flange 10, the lower leg of the U having mounted thereon means, such as screws 13, whereby the bracket can be rigidly clamped to the instrument board. The bracket here shown includes a downwardly extending member or arm 14 to which the forward end of the lever 8 is pivotally connected, the lever extending upwardly and rearwardly on one side of the steering column to a position in which it can be conveniently engaged and actuated by the hand of the driver. In the form shown the lever is provided at its rear end with a finger piece 15 on which the fingers of the driver may rest and control the movement of the lever. The lever is so connected with the pedal 5 that the downward movement of the lever will impart downward movement to the pedal and upward movement of the pedal, by the aforesaid spring means, will impart upward movement to the lever.

The connection between the lever 8 and the pedal may take various forms, but preferably it comprises a crank arm 16 rigidly connected with the lever for movement about the axis of the lever. In the arrangement shown a short shaft 17 is rotatably mounted in the lower portion of the arm 14 of the bracket and the lever 8 and crank arm 16 are rigidly secured to the shaft, as by pinning the same thereto. The crank arm extends rearwardly from its axis and is connected with the pedal by a rigid elongate member 18 which is pivotally connected at its upper end with the crank arm and at its lower end with the pedal, so that the pedal and lever will move in unison. The elongate member 18 is preferably adjustable in length to enable it to be applied to vehicles in which the pedals are spaced different distances from the instrument boards. In the present instance it is in the nature of a bar comprising two overlapping portions, each provided with a series of openings 19 adapted to receive bolts 20, or the like, whereby the two parts of the bar may be connected one with the other in different overlapping positions. The lower end of the elongate member 18 may be connected directly with the pedal but to avoid interference between the member 18 and the foot of the operator it is preferable that the point of connection should be spaced some distance from the pedal. For this purpose a connecting member, such as a bracket 21, is rigidly secured to the pedal, as by bolts or rivets 22, extends forwardly therefrom and is provided at its forward end with a lug 23 to which the lower end of the member 18 is pivotally attached.

Thus it will be apparent that the throttle may be controlled either by the foot operation of the pedal or by the hand operation of the lever 8 and that the lever and pedal move in unison so that the position of the lever always corresponds to the position of the pedal, and control may be shifted from one to the other without imparting movement to either, and, therefore, without altering the speed at which the vehicle is moving. If desired, adjustable means may be provided for limiting the upward movement of the lever 8 and thus providing a temporarily fixed open position for the throttle until the engine has become warm, the screw being then retracted to permit the lever to move to throttle closing position when desired. For this purpose the bracket 11 is provided with a rearwardly extending part in which is mounted an adjustable member, such as a screw 24, the lower end of which is arranged to engage a part 25 of the lever and thus interrupt the movement of the lever in throttle closing direction at the desired point in its movement.

Ordinarily the pedal 5 is arranged on the right hand side of the steering column, and it is preferable to locate the crank arm 16 immediately above the pedal, and usually the actuating lever 8 is either connected directly with or located close to the crank arm and thus extends rearwardly on the right hand side of the steering column. However, some drivers might prefer that the lever should be arranged on the left hand side of the steering column, and means are provided whereby the lever may be so located. For this purpose the shaft 17 is provided with an extension 17a which extends across the steering column 9 and is mounted in a bracket 26 which is attached to the instrument board in the same manner as the bracket 11, the shaft extension 17a being provided with an offset portion 27 to permit it to extend about one side of the steering column. A lever 8a is rigidly secured to the shaft extension 17a adjacent the bracket 26 and thus extends rearwardly on the left hand side of the steering column. The shaft extension may be an integral part of the shaft 17, but is here shown as a separate part adapted to be connected with the shaft 17 by a suitable coupling, such as a sleeve 28, extending about and rigidly secured to the adjacent ends of the shaft and the shaft extension. Thus an actuating device designed for right hand operation can readily be converted into a left hand device. When so converted the right hand lever 8 may be removed or both levers may be retained, thus adapting the device for operation by either a right handed man or a left handed man.

It will be obvious that by the use of the manually operated lever there is no possibility of the driver opening the throttle when he intends to actuate the brake, as sometimes happens when using a foot operated control, and should the driver become incapacitated his fingers will slip off the lever or at least relieve the pressure thereon.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. A supplemental throttle controlling device for a motor vehicle in which the throttle is controlled by a pedal within and above the floor of the body of the vehicle, said controlling device being located wholly within said body and including a supporting structure adapted to be mounted in a fixed position on the instrument board of said vehicle, a lever pivotally mounted on said supporting structure for movement about a transverse axis and extending rearwardly from said axis to a position adjacent to and above the level of the driver's seat of said vehicle, in which position it may be actuated by the hand of the driver, and an elongate rigid member connected at its upper end with said lever for longitudinal movement thereby when said lever moves about said transverse axis, said elongate member having at its lower end means whereby it may be connected with said pedal to impart throttle controlling movement to the latter.

2. A supplemental throttle controlling device for a motor vehicle in which the throttle is controlled by a pedal within and above the floor of the body of the vehicle, said controlling device being located wholly within said body and including a supporting bracket having means whereby it may be rigidly secured to the instrument board of said vehicle, a lever pivotally mounted on said bracket for movement about a transverse axis and extending rearwardly from said axis to a position adjacent to and above the level of the driver's seat of said vehicle, in which position it may be actuated by the hand of the driver, a crank arm connected with said lever for movement therewith about said axis, and an elongate rigid member pivotally connected at one end with said crank arm and having means whereby it may be connected with said pedal to move said pedal in unison with said lever.

3. A supplemental throttle controlling device for a motor vehicle in which the throttle is controlled by a pedal supported above the floor of said vehicle, said device including a supporting structure adapted to be mounted within the body of said vehicle in a fixed position adjacent the instrument board thereof, a lever pivotally mounted on said supporting structure for movement about a transverse axis and extending rearwardly from said axis to a point adjacent to and above the level of the driver's seat, means for connecting said lever with said pedal to cause the lever and the pedal to move in unison, and a member adjustably mounted on said supporting structure to interrupt the movement of said lever in throttle closing direction while said throttle is partly open.

4. A supplemental throttle controlling device for a motor vehicle having a steering column and a throttle controlling pedal above the floor of the body of the vehicle, a shaft supported on a fixed part of said body for movement about an axis transverse to said vehicle and extending beyond both sides of said steering column, a crank arm secured to said shaft on one side of said steering column above said pedal, means for connecting said crank arm with said pedal to cause the crank arm and the pedal to move in unison, and a lever secured to said shaft on the other side of said steering column and extending rearwardly from said shaft to a position adjacent to and above the level of the driver's seat.

5. A supplemental throttle controlling device for a motor vehicle having a steering column and a throttle controlling pedal above the floor of the body of said vehicle, said device comprising a lever, means for pivotally mounting said lever on a part of said vehicle within the body thereof and in the rear of said steering column for movement about a transverse horizontal axis, said lever extending rearwardly beyond said steering column and having at its rear end a part adjacent to and above the level of the driver's seat for engagement by the hand of the driver, a crank arm connected with said lever for movement therewith about said axis and extending rearwardly from said axis, a rigid member pivotally connected at one end with said crank arm and means for pivotally connecting said rigid member with said pedal.

ARTHUR V. T. HOUSER.

REFERENCES CITED

The following references are of record in the file of this patent:

UNITED STATES PATENTS

| Number | Name | Date |
| --- | --- | --- |
| 1,316,727 | Koressios | Sept. 23, 1919 |
| 1,552,207 | Bronnenberg | Sept. 1, 1925 |
| 1,906,366 | Burns | May 2, 1933 |
| 2,023,034 | Seaholm | Dec. 3, 1935 |
| 2,221,274 | Taylor | Nov. 12, 1940 |
| 2,348,265 | Rippingille | May 9, 1944 |
| 2,411,500 | Bradley | Nov. 26, 1946 |

FOREIGN PATENTS

| Number | Country | Date |
| --- | --- | --- |
| 259,338 | Great Britain | Oct. 14, 1926 |
| 547,850 | France | Oct. 4, 1922 |